Feb. 24, 1959

A. C. SPENCER 2,874,877

DISPENSING DEVICE AND CONTAINER THEREFOR

Filed Sept. 11, 1956

2 Sheets-Sheet 1

INVENTOR
A. C. SPENCER

BY *A. Yates Dowell*
ATTORNEYS

Feb. 24, 1959

A. C. SPENCER 2,874,877

DISPENSING DEVICE AND CONTAINER THEREFOR

Filed Sept. 11, 1956

2 Sheets-Sheet 2

INVENTOR
A. C. SPENCER

BY *A. Yates Dowell,*
ATTORNEYS

United States Patent Office 2,874,877
Patented Feb. 24, 1959

2,874,877

DISPENSING DEVICE AND CONTAINER THEREFOR

Alvin C. Spencer, Corona del Mar, Calif.

Application September 11, 1956, Serial No. 609,216

5 Claims. (Cl. 222—162)

The present invention relates to packaging and dispensing of viscous material such as printers' ink and particularly to a container in which the material is packaged to be protected from contact with the air, a device for forcing the viscous material from the container while maintaining the material within the container out of contact with the air, and to a method of handling and dispensing the viscous material to maintain the material free from deterioration.

Heretofore various types of containers and dispensing devices have been used, including those shown in my prior Patents 2,661,126 and 2,745,575 with reasonably satisfactory results, but it has been found that the dispensing devices were not entirely satisfactory when used with containers or cans having relatively thin pistol-like bottoms, and because the skirt portion of the piston-like bottom allowed some of the ink to be lost through leakage resulting in ink being smeared on the hands of the printer, on the dispensing device and/or on the shelf on which the ink was stored.

The object of the present invention is to overcome the difficulties encountered with the handling of viscous material, such as printers' ink, and to provide a device and container for dispensing the material expeditiously.

A further object is to provide a method of handling viscous material without danger of formation of scum due to contact with the air.

A further object is to provide a hand operated dispensing device adapted to be readily secured to one end of a container and designed to force material out of the other end of the container in a manner avoiding loss of material.

A further object is to provide a system of handling viscous material of many kinds in which only small increments of the material of one kind is used at a time and to handle such materials in a manner to prevent loss or waste between periods of use.

Figure 1:
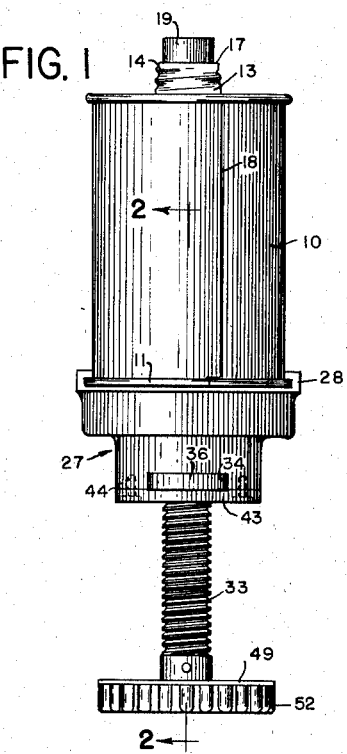
Figure 2:
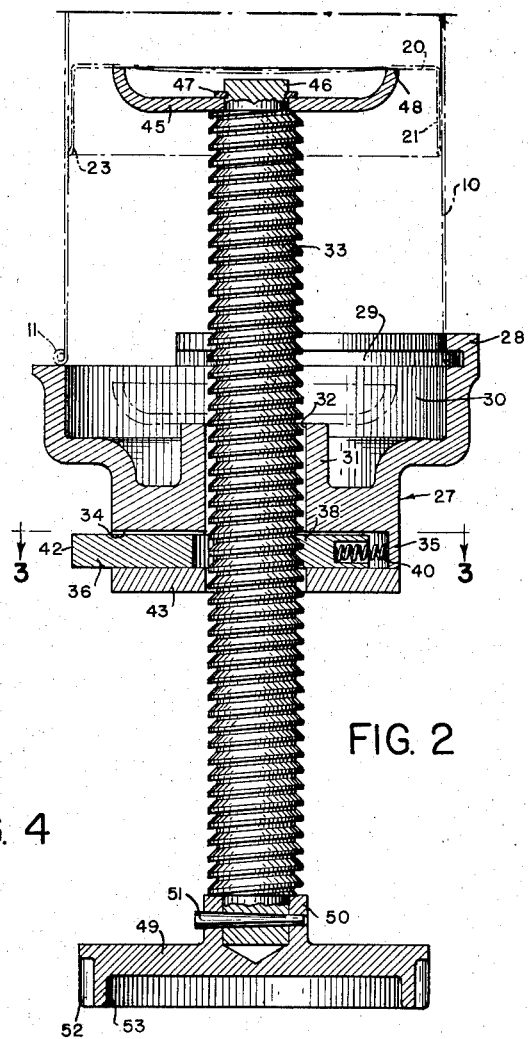
Figure 4:
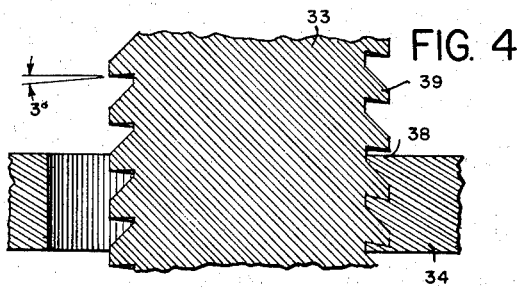
Figure 3:
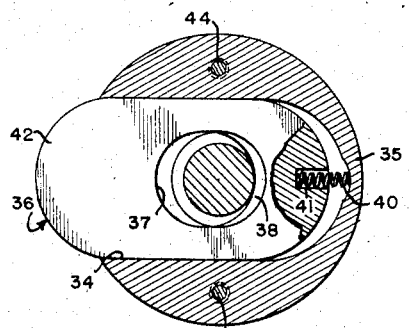
Figure 5:
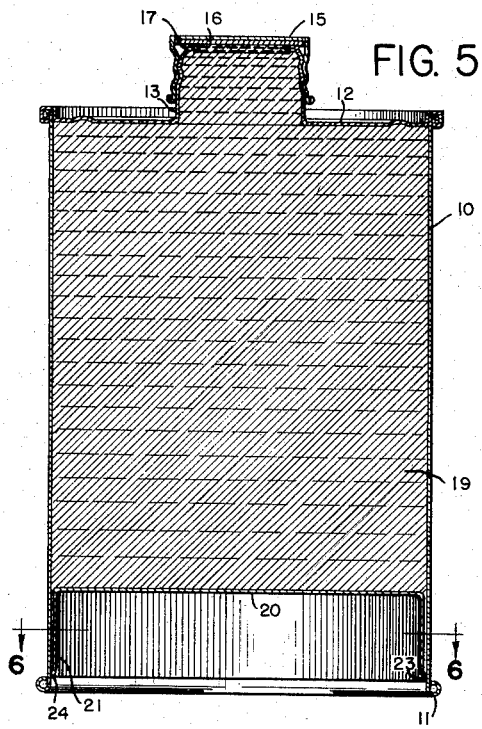
Figure 6:
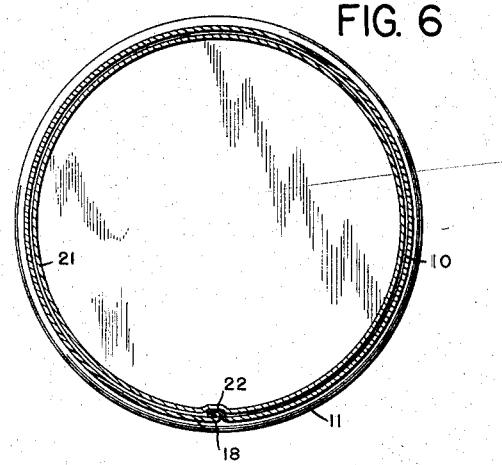
Figure 7:
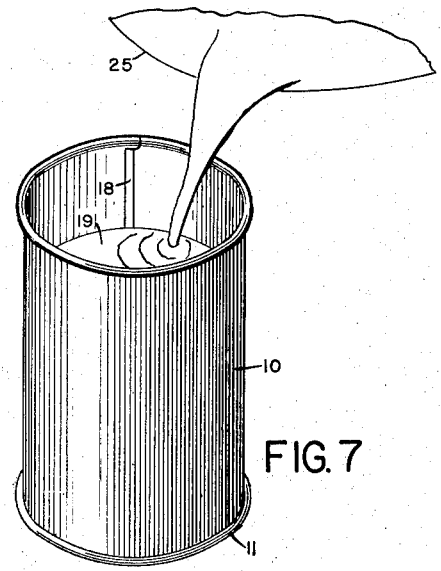
Figure 8:
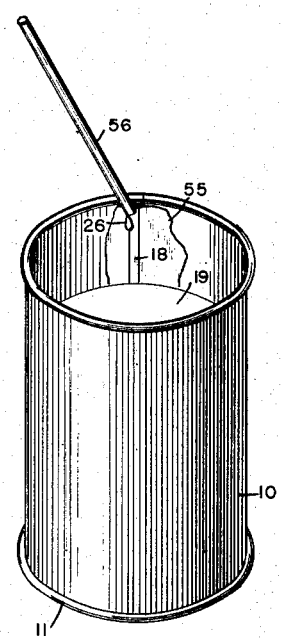

Other and further objects will be apparent as the description proceeds and upon reference to the accompanying drawings wherein:

Fig. 1 is a front elevation of the dispensing device and container of the present invention in cooperative relation showing some of the contents being forcibly dispensed from the container;

Fig. 2, an enlarged vertical section taken substantially on line 2—2 of Fig. 1, showing the screw with its cooperating releasable nut in operative position, the container being shown in phantom;

Fig. 3, a horizontal section taken substantially on line 3—3 of Fig. 2 and showing the releasable nut in operative position;

Fig. 4, an enlarged fragmentary vertical section of the screw and the releasable nut illustrating the buttress type undercut threads for positively maintaining the nut and screw in operative relation;

Fig. 5, a vertical section of a filled container, according to the present invention, with the piston-like bottom in its lowermost sealing position;

Fig. 6, a horizontal section taken substantially on line 6—6 of Fig. 5, showing the seam of the container sidewall and the seam accommodating indentation in the skirt of the piston-like bottom;

Fig. 7, a perspective view of an inverted container being filled through its open bottom, before being closed by the piston-like bottom; and Fig. 8, a perspective view illustrating the application of wax to the seam portion for assuring seal with the bottom piston after the can has been filled.

Briefly, the present invention includes a cylindrical open bottom container or can with an outwardly projecting rib around its bottom. Said container has a discharge opening in the top, which is closed by a removable cap, the container being adapted to be filled through its open bottom, and the open bottom being closed by a hollow cylindrical piston having a flat head and an outwardly flaring skirt, with the piston designed to snugly fit the inner periphery of the container and, when the container is provided with an inwardly projecting seam, the piston is provided with a depression in the skirt portion for accommodating the same. To assure that no leakage may occur between the seam and the piston a small quantity of wax is applied to the can to fill any passages which may exist between the piston and the can.

For dispensing the material from the can, a device including a hollow downwardly tapering hub with a grooved flange over a major portion of its periphery is adapted to receive and retain the outwardly projecting rib formed on the outer surface of the can bottom. A buttress type screw is slidably and rotatably mounted axially in the hub carrying a dish-shaped plunger member freely rotatable on its upper end, the periphery of the dish-shaped member engaging the under surface of the piston head whereby the piston may be forced upwardly and the material in the container may be forced out of the opening in the can top upon removal of the closure therefor. A releasable nut cooperating with the screw is provided in the hub to permit rapid movement of the screw and plunger. A relatively large disc-shaped handle fixed to the lower end of the screw serves as a supporting base for the device, with or without a container thereon.

In dispensing material, the device may be rapidly applied to filled cans or partially emptied cans, and the contents of the cans may be dispensed in controlled quantity by the rotation of the handle and, after use, the cans may be closed without having any air present, thereby avoiding oxidation or deterioration of the contents and avoiding loss of material without danger of soiling the hands of the user, the work being processed or the storage areas.

Referring more specifically to the drawing, a can or container 10 having an open bottom with an outwardly projecting rib 11 and a closed substantially flat top 12 fixed to the can in any suitable manner, with a dispensing opening therethrough and a discharge neck 13 affixed to the top 12 in any suitable manner, said neck having screw threads 14 for receiving a threaded cap 15 having a gasket 16 for engaging an inwardly turned bead or lip 17 for sealing the can. The can is provided with the usual interlocking longitudinal seam 18 projecting inwardly thereby interrupting the smooth cylindrical surface of the remaining portion of the can 10. The can is shown as being filled with a relatively viscous ink 19 from the lip 10 of the neck almost to the bottom, leaving sufficient space at the bottom for a hollow cylindrical piston having a normally substantially flat head 20 and a downwardly and outwardly flaring skirt 21 with the piston being designed to snugly fit the inner periphery of the can, the skirt 21 of the piston being provided with an inwardly depressed portion 22 which provides a depression for snugly receiving the inwardly projecting seam 18 of the can. It will be noted that the bottom edge portion 23 of the skirt 21 is additionally bent outwardly to provide a sharp edge 24 which tightly contacts the inner periphery of the can, thereby providing a substantially fluid tight seal between the extreme sharp edge 24 of the skirt 21.

For simplification of illustration, the piston skirt 21 is shown as being of less diameter than the inner periphery of the can 10, but in actual construction the outer periphery of the piston skirt 21 is substantially the same as the inner periphery of the can and the sharp edge portion 24 tightly contacts the can with a resilient and constant pressure and with a scraping action which serves to maintain a tight seal at all times. In filling, the can, with the piston bottom removed, is inverted and the ink is inserted through the open bottom of the inverted can as diagrammatically illustrated in Fig. 7, the ink being poured from a large supply 25 into the inverted can 10, but the ink is normally more viscous than to permit pouring and the can 10 may be filled in any suitable manner approximately to the level of the ink 19 shown in Figs. 7 and 8. Thereafter, a small quantity of wax 26 is applied to the inner periphery of the can, particularly in the region of the seam 18, and thereafter the piston bottom is applied to the can with the depressed portion or groove 22 of the piston skirt in registry with the seam 18 of the can as shown in Fig. 6, and the piston is pressed down until the head 20 thereof contacts the ink 19 and any air between the piston and the ink is expelled along the skirt portion of the piston until the air is excluded from the confined portion of the can between the piston, the walls, and the top of the can.

The can, when so filled and with the piston applied to exclude air, is ready for shipment or storage since the piston is retained in the can without danger of separation therefrom and the ink is maintained in a condition out of contact with the air so there is no danger of deterioration of the ink. The wax 26 provided adjacent the seam 18 prevents any possibility of leakage due to irregularity in the construction, and any ink which may contact air will always be at the bottom adjacent the periphery of the piston where it cannot mix with the ink and cannot be dispensed through the neck 13.

For dispensing the ink from the can, a device including a downwardly tapering hub 27 with a peripheral flange 28 extending slightly more than half-way around the upper edge of the hub 27 and having a groove 29 on its inner periphery snugly receiving the outwardly projecting rib of the can 10, the can preferably being slid into the groove 29 with the seam 18 of the can positioned away from the flange 28 so that any slight difference in thickness of the rib 11 adjacent the seam portion will not adversely affect the retention of the can in the groove. The hub is provided with an annular recess 30 into which a boss 31 projects, said boss being provided with a smooth axial bore 32 for snugly receiving a buttress type screw shaft 33 for rotating and sliding movement of the screw shaft relative to the hub 27. The lower portion of the hub 27 is provided with a transversely extending slot 34 extending from the front substantially to the rear and terminating in a wall 35. A slide 36, having an elongated aperture 37 therethrough, is slidably mounted in the hub 34 so that the screw shaft 33 extends through the aperture 37. The rear edge of the aperture 37 is provided with threaded portions 38 which cooperate with threads 39 of the screw 33, the slide 36 being normally urged to cause the threaded portions 38 to engage the threads 39 by a compression spring 40 received in a bore 41 in the slide 36. When it is desired to rapidly move the screw 33 the slide 36 is moved by pressure of the thumb of the user on its front edge portion 42 to overcome the pressure of the spring 40 so the thread portions 38 become disengaged from threads 39. The slide 36 is retained on the hub portion 27 by a plate 43 secured to the hub 27 by means of screws 44 having their heads countersunk in the plate 43 and being screwed into tapped holes in the hub 27. The buttress threads of the screw 33 and the nut portions 38 are undercut 3 degrees as shown for positive cooperation and to prevent slipping.

Rotatively mounted on the upper end of the buttress screw 33 is a dish-shaped plunger 45 which is retained on a reduced end portion 46 of the screw shaft 33 by means of a spring washer 37 received in a groove. The dish-shaped plunger 45 provides an annular piston engaging edge portion 48 which engages the piston head 20 of the piston bottom of the can closely adjacent the skirt portion of the piston bottom so that when pressure is applied by rotation of the screw such pressure is transmitted to the piston bottom 20 and the reaction of the ink in the can tends to depress the central portion of the piston head 20, thereby producing a lever action about edge 48 as a fulcrum which additionally urges the skirt portion 21, and particularly the edge portion 23 and the sharp edge 24 of the skirt, tightly against the side of the can to increase the effectiveness of the seal between the piston bottom and the can. The ink is scraped from the walls of the can by the sharp edge 24 pressing tightly against the inner periphery of the can. This deflection of the piston bottom is diagrammatically illustrated by phantom lines in Fig. 2.

For manipulation of the dispensing device and for rotation of the screw 33, a relatively large disc-shaped handle 49 is secured to the lower end of the screw 33 by the provision of a reduced end portion of the screw being received in a hollow boss 50 of the disc handle 49 and retained thereon by means of a taper pin 51 in a well-known manner. A plurality of indentations 52 are provided in a downwardly extending flange portion 53 in the handle 49 to provide for effective gripping of the handle by the person's hands.

From the above description the use of the present invention, including the dispensing device, container, and the method of dispensing, is believed to be obvious. The cans may be filled at the ink manufacturing plant or the cans may be filled at the printing establishment by filling an inverted bottomless can in a manner to exclude air and then applying sufficient wax adjacent the seam portion of the can in an area roughly indicated by the area 55, the wax being applied in a suitable manner as by means of a spout or tube 56 which may be supplied from a suitable source of molten wax, it being preferable to maintain the wax out of contact with the ink, and thereafter the piston bottom is applied to the can and pressed firmly into contact with the ink 19, the sharp edge portion 24 of the skirt of the piston tightly engaging the inner periphery of the can in a region where the wall of the can is of uniform shape, thereby providing an effective seal for the bottom of the can without danger of the bottom dropping out and the contents being lost.

When it is desired to dispense any quantity of ink from a filled can, the can is positioned on the hub portion 27 of the dispensing device with the outwardly projecting rib 11 at the bottom being received in the groove 29 of the flange 28 and with the seam 18 of the can preferably extending to the front to avoid having the double thickness of the bead portion 11 interfering with the insertion of the can rib 11 into the groove 29. It will be evident that the dish-shaped plunger 45 is positioned within the recess 30 of the dispensing device prior to the application of the can to the dispensing device to avoid interference, and after the can is positioned the slide 36 is moved by pressure on the end 42 thereof, releasing threaded portion 38 from the screw 33, whereby the operator can slide the screw along until the plunger 45 contacts the piston bottom, and thereafter upon removal of pressure on the end 42 the slide 36 is moved by the spring 40 into the position shown in Figs. 2 and 3. The printer removes the cap 15 from the can and upon rotation of the handle 49 and the screw 33 the piston bottom is moved toward the top and the ink 19 is forced out of the neck 13 in a uniform strip and such ink may be applied directly to the inking rollers or platen of a printing press and the printer may assist in the operation by the use of an ink knife or the like. After a desired quantity of ink has been dispensed, the cap 15 is reapplied so as to avoid the presence of air between the cap and the ink and this operation may be accurately controlled by backing off the screw 33 any desired amount. To assure that no ink will be forced out the top when the cap is first removed, it is desirable to push down the top prior to opening the can so that there will be no internal pressure on the contents. Thereafter the contents are dispensed in the manner described.

The present invention is particularly useful where different colors of ink are used in small quantities, since the ink in the can is never exposed to the air and therefore does not have a scum or ink skin formed thereon and therefore the resulting printing is always acceptable and the number of rejected items is greatly reduced. Further, the quantity of ink dispensed can be accurately estimated from the number of turns of the screw as well as from the length of the strip of ink being forced out of the neck 13 and therefore when different colors of inks are to be combined it is possible to more accurately duplicate colors without having to use separate measuring containers for each ink, thereby avoiding smearing, confusion, and loss of time.

Also, the storage problem of small quantities of ink is greatly reduced, without soiling or smearing of shelves or employees, and the can always appears neat and clean, thereby improving the appearance of the shop and increasing efficiency. Also, the amount of ink remaining in each can can be accurately estimated from the position of the piston bottom and substantially all of the ink in a can may be used because of the flat shape of the piston bottom and the top of the can.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A device for dispensing viscous material from a container having a piston-like bottom wall comprising a downwardly tapering hollow hub member having an open top recess in the upper portion thereof with a peripheral grooved flange extending upwardly from the large end of said hub member over a major portion of the periphery thereof for retaining a can in said flange, an undercut buttress-type screw slidably and rotatively mounted axially in said hub, a nut segment having cooperating undercut threaded portions for engagement with said screw, means to normally urge said nut portion into contact with said screw and means for releasing said nut portion from said screw, an upwardly flaring dish-shaped member receivable in said upwardly open recess and rotatively mounted on the upper end of said screw for engaging the piston portion of a container closely adjacent the periphery thereof leaving the piston body substantially unsupported in its mid portion, a handle fixed to the lower end of said shaft and of a size and shape to support the device on a flat surface with a container in position on said flange.

2. A device for dispensing viscous material from a container having a piston bottom wall comprising a hub member, means to retain a can on said hub member, an undercut buttress-type screw slidably and rotatively mounted axially in said hub, a slide having a nut segment with cooperating buttress type threaded portions for engagement with said screw, means to normally urge said slide with the nut segment into contact with said screw, means for releasing said nut segment from said screw to provide for rapid sliding adjustment of said screw in said hub, a plunger on the upper end of said screw for engaging the piston bottom wall of a can closely adjacent the periphery thereof leaving the piston body substantially unsupported in its mid portion, a handle fixed to the lower end of said screw and of a size and shape to serve as a base for the device and as an operating handle for said screw.

3. A container for receiving and dispensing highly viscous material comprising a tubular body closed at one end with an opening in said one end closed by a removable cap, a hollow cylindrically shaped piston slidably mounted in said can providing a bottom therefor, said piston having a flat end wall and a peripheral cylindrical wall providing a skirt projecting downwardly from said flat portion for guiding the piston in said can, the lower edge of said cylindrical skirt portion of the piston being continuous and outwardly flared for effectively and tightly engaging the inner periphery of the tubular body to obtain a substantially tight joint and to provide a detent action throughout the entire periphery of said piston, said container being provided with an outwardly extending bead on its lower exterior periphery of sufficient size and strength to take the reaction between the piston and the container so that viscous material in the can may be effectively dispensed through the opening in the upper end of the can.

4. The invention, according to claim 3, in which the container is provided with a longitudinal seam having an inwardly projecting portion rendering the inner periphery irregular, said piston being provided with an indentation in its skirt portion for receiving the seam to prevent leakage of viscous material from said container.

5. A method of filling a container having one end closed and the other end open, comprising filling the container from the open end so as to leave a piston receiving space in the said open end, applying a quantity of wax to the inner periphery of the container adjacent the material to compensate for irregularities in the inner periphery and applying a hollow cylindrical piston with its head extending toward the closed end of the container and forcing the piston until its head contacts the material over substantially its entire area thereby sealing the open end of the can with a seal in a manner excluding air therefrom.

References Cited in the file of this patent

UNITED STATES PATENTS

| 949,545 | Muller | Feb. 15, 1910 |
| 1,007,525 | Bush | Oct. 31, 1911 |
| 1,233,510 | Rognlie | July 17, 1917 |
| 1,259,474 | Barr | Mar. 19, 1918 |
| 1,439,992 | Bartezki | Dec. 26, 1922 |
| 1,692,096 | Scott | Nov. 20, 1928 |
| 2,070,206 | Hudson | Feb. 9, 1937 |
| 2,649,999 | Burch | Aug. 25, 1953 |

FOREIGN PATENTS

| 56,006 | Norway | Dec. 30, 1935 |
| 1,015,849 | France | Oct. 24, 1952 |